United States Patent
Gruber et al.

(10) Patent No.: US 6,201,088 B1
(45) Date of Patent: Mar. 13, 2001

(54) CYANOACRYLATE ADHESIVE

(75) Inventors: Werner Gruber, Korschenbroich (DE); Yuri Gololobov, Moscow (RU); Hanns Misiak, Wennigsen/Bredenbeck; Dagmar Behn, Hannover, both of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/269,654
(22) PCT Filed: Sep. 22, 1997
(86) PCT No.: PCT/EP97/05183
§ 371 Date: Mar. 30, 1999
§ 102(e) Date: Mar. 30, 1999
(87) PCT Pub. No.: WO98/14526
PCT Pub. Date: Apr. 9, 1998

(30) Foreign Application Priority Data

Sep. 30, 1996 (DE) .............................. 196 40 202

(51) Int. Cl.[7] .................................. C08F 236/12
(52) U.S. Cl. ............... 526/298; 526/321; 526/323.2; 526/325; 526/335; 526/338
(58) Field of Search ................... 526/298, 916, 526/335, 338, 321, 323.2, 325

(56) References Cited

U.S. PATENT DOCUMENTS

| | | | |
|---|---|---|---|
| 3,254,111 | 5/1966 | Hawkins et al. | 260/465.4 |
| 3,316,227 | 4/1967 | Gerber | 260/88.7 |
| 3,654,340 | 4/1972 | Banitt | 260/465.4 |
| 4,425,471 * | 1/1984 | Millet | 526/298 |
| 5,386,047 * | 1/1995 | Nakos et al. | 556/416 |

FOREIGN PATENT DOCUMENTS

| | | |
|---|---|---|
| 1 415 102 * | 11/1975 | (GB) . |
| 61-145267 | 7/1986 | (JP) . |
| 3-167279 | 7/1991 | (JP) . |
| WO94/15907 | 7/1994 | (WO) . |

OTHER PUBLICATIONS

Krishnamurti et al., Synthesis of 3–Substituted–2–cyanoacrylates, Journal of Applied Polymer Science, vol. 49, 1387–1394, 1993.*

Patent Abstracts of Japan, vol. 015, No. 409 (C–0876) Jul. 19, 1991.

Patent Abstracts of Japan, vol. 010, No. 339 (C–385) Feb. 7, 1986.

Journal of Applied Polymer Science, vol. 49 (1993) pp. 1387–1394.

Journal of Polymer Science: Polymer Chemistry Edition, vol. 16, (1978) pp. 2475–2507.

Ullmann's Encyclopedia of Industrial Chemistry, 5th ed., vol. A1, p. 240, (1985).

DIN 54 453 Jan. 1985.

* cited by examiner

Primary Examiner—David W. Wu
Assistant Examiner—R. Harlan
(74) Attorney, Agent, or Firm—Wayne C. Jaeschke; Stephen D. Harper

(57) ABSTRACT

Cyanoacrylate adhesives which have increased heat resistance, yet also exhibit good storage stability and acceptable cure times, are obtained by using 2-cyanopentadienoic acid esters in combination with alkylene bis-(2-cyanopentadienoates).

22 Claims, No Drawings

CYANOACRYLATE ADHESIVE

BACKGROUND OF THE INVENTION

1. Field of the Invention

This invention relates to a cyanoacrylate adhesive containing 2-cyanopentadienoic acid ester and to its production and use.

2. Discussion of Related Art

Cyanoacrylate adhesives are one-component reactive adhesives based on monomeric 2-cyanoacrylates. They have cornered the market through extremely quick curing which, depending on the substrate, takes only a few seconds. The resulting properties satisfy many industrial requirements. However, there are special applications where they are still in need of improvement. For example depolymerization is possible at temperatures of only around 100° C. so that prolonged exposure to temperatures above 80° C., should be avoided.

This problem of inadequate heat stability has been repeatedly discussed, for example in *Journal of Applied Polymer Science* 49, (1993), pages 1387–1394. This literature reference first of all describes the production and characterization of alkyl-2-cyano-2,4-pentadienoates and alkyl-2-cyano-2,4-hexadienoates and of bis-(2-cyano-2,4-hexadienoates) and then investigates the effect of adding 10% by weight of individual alkyl esters on the thermal stability of polycyanoacrylic acid propyl ester. The results show that heating for 1 hour to 150° C. does not have an adverse effect on strength at 25° C. In the absence of such an addition, however, there is a reduction in strength to about one quarter of the original value. There is no reference to strength at elevated temperature, nor any indication of how it can be improved.

WO 94/15907 describes cyanoacrylate adhesives with improved resistance to heat and moisture through the use of cyanoacrylate-terminated linear polymers, for example polyisobutylene or polyalkyl methacrylates (see page 4, line 16 to page 5, line 7 and page 10, line 27 to page 11, line 12). There are no specific references either to the composition of the adhesives or to their adhesive properties.

The fact that an addition of biscyanoacrylates to cyanoacrylate adhesives can lead to problems, particularly in regard to storage life and curing rate, is well known. In *Journal of Polymer Science: Polymer Chemistry Edition*, Vol. 16, pages 2475–2507 (1978), Carl J. Buck describes a mixture of isobutyl cyanoacrylate and bis-(2-cyanoacrylates). N,N-dimethyl-p-toluidine (DMPT) is required to initiate the polymerization reaction. A composition of 90% by weight of methyl cyanoacrylate and 10% by weight of octanediol bis-cyanoacrylate takes one day to cure at 38° C. (see page 2504, last paragraph, and page 2505).

Against the background of this prior art, the problem addressed by the present invention was to provide a cyanoacrylate adhesive which would show increased heat resistance for substantially the same storage behavior and acceptable cure times.

SUMMARY OF THE INVENTION

The solution provided by the present invention is defined in the claims and is essentially distinguished by the fact that, in addition to at least one typical monocyanoacrylate, the cyanoacrylate adhesive containing 2-cyanopentadienoic acid alkyl ester (CPDS-alkyl) also contains an effective quantity of at least one alkylene bis-(2-cyanopentadienoate) (bis-CPD).

DETAILED DESCRIPTION OF THE INVENTION

In the context of the invention, "typical monocyanoacrylates" are understood to be compounds corresponding to the following general formula:

$$H_2C=C(CN)-CO-O-R \qquad (I)$$

where R is an alkyl, alkenyl, cycloalkyl, aryl, alkoxyalkyl, aralkyl or haloalkyl group, more especially a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl and 2-ethoxyethyl group. The cyanoacrylates mentioned above are known to the expert on adhesives, cf. Ullmann's Encyclopaedia of Industrial Chemistry, Vol. A1, page 240, Verlag Chemie Weinheim (1985) and U.S. Pat. Nos. 3,254,111 and 3,654,340. Preferred monomers are the allyl, methoxyethyl, ethoxyethyl, methyl, ethyl, propyl, isopropyl or butyl esters of 2-cyanoacrylic acid. The monocyanoacrylates represent the largest percentage by weight of polymerizable monomers in the adhesive.

The abbreviation "bis-CPDs" is understood to apply to compounds corresponding to the following general formula:

$$[CH_2=CH-CH=C(CN)-CO-O]_2R^1 \qquad (II)$$

where $R^1$ is a branched or unbranched difunctional alkylene radical containing 2 to 18 and more particularly 2 to 4 carbon atoms which may also contain hetero atoms, such as halogens and oxygen. However, $R^1$ is preferably a pure hydrocarbon. It is important that the bis-CPDs should be particularly pure. This requirement is satisfied, for example, by the following production and purification methods. Basically, the cyano-pentadienoates may be obtained by the Gerber method (A. H. Gerber, U.S. Pat. No. 3,316,227 (1967)). However, the compounds are obtained in greater purity if, in contrast to the method mentioned above, the reaction mixture is taken up in 4 to 5 times the volume of ca. 5% hydrochloric acid and the precipitate formed is recrystallized from petroleum ether after filtration and drying in air. After drying in a high vacuum, the yields are generally of the order of 50 to 70%. The adhesive formulations prepared with a product obtained in this way are distinguished by greater reactivity, i.e. faster setting times, and also by better stability in storage.

In addition, the required CPDS-alkyl/bis-CPD mixture can be obtained by a one-pot synthesis, i.e. by simultaneous reaction of the corresponding cyanoacetates in one and the same batch.

The abbreviation "CPDS-alkyl" is understood to apply to compounds corresponding to the following general formula:

$$CH_2=CH-CH=C(CN)-CO-O-R^2 \qquad (III)$$

where $R^2$ is a branched or unbranched monofunctional alkyl radical containing 1 to 10 carbon atoms and more particularly 1 to 4 carbon atoms which may also contain hetero atoms, such as halogens and oxygen. However, $R^2$ is preferably a pure hydrocarbon. It is important that the CPDS-alkyls should be particularly pure. This requirement is satisfied, for example, by the production and purification method described above.

The bis-CPDs and CPDS-alkyls in pure form can be stored in light for about 4 weeks at room temperature without significantly discoloring or undergoing changes in their melting points. In a refrigerator, i.e. at T <10° C./darkness, they can be stored for at least 6 months. However, they can presumably be stored for much longer.

The compounds are stable to extremely weak bases and nucleophiles, for example water. In the presence of medium-strong to strong bases, for example amine bases, phosphines, lyes, they undergo spontaneous polymerization similarly to the cyanoacrylates.

The 2-cyanopentadienoates (CPDS-alkyl and bis-CPD) should preferably be added in a quantity of up to 25% by weight and more preferably in a quantity of 1 to 15% by weight, based on the total weight of the adhesive formulation.

The ratio by weight of CPDS-alkyl to bis-CPD can vary within wide limits, although it should preferably be in the range from 4 to 0.25:1 and more preferably in the range from 2 to 0.5:1.

The adhesive may contain additives, for example plasticizers, thickeners, stabilizers, primers, dyes etc. The adhesive preferably contains stabilizers such as, for example, hydroquinone and sulfur dioxide.

The adhesive is prepared in the usual way by mixing the components, preferably by dissolving the respective additives at room temperature.

In all the cases investigated, the stability of the new adhesives in storage exceeded 3 months at room temperature or 3 days at 60° C.

The new cyanoacrylate adhesive according to the invention is particularly suitable for bonds which have to satisfy stringent thermal requirements, for example the bonding of electrical and electronic components.

The Invention is Illustrated by the Following Examples

I. Starting Compounds and Their Preparation 1. 2-Cyanopentadienoic acid methyl ester=CPDS-Me
2. 2-Cyanopentadienoic acid ethyl ester=CPDs-Et
3. Tetramethylene-bis-(2-cyanopentadienoate)=TMBCP
4. Ethylene-bis-(2-cyanopentadienoate)=bis=CPD
5. Ethyl cyanoacrylate
6. Isopropyl cyanoacrylate Comonomers 1 to 4 were prepared by the method described above.

The comonomers were characterized by CHN analysis, IR spectroscopy and $^1$H-NMR.

II. Composition and Production of the Cyanoacrylate Adhesive

The composition in respect of the monomers is shown in Tables 1 and 2. The addition of comonomers in % by weight is based on the final adhesive formulation.

In addition to the monomers, the adhesive contains the following additives:

1. 500 ppm hydroquinone
2. 10 ppm sulfur dioxide.

The cyanoacrylate adhesive according to the invention can be prepared from these components in the usual way. Preferably, all the components of the adhesive are dissolved at room temperature by shaking or stirring.

The adhesive has typical viscosities of about 2.2 to 4.0 mPas (at 20±0.1° C., as measured in accordance with DIN 54453). Their storage life is also within the usual limits. All the samples prepared were still liquid after storage for 3 months at room temperature.

III. Adhesive Properties

1. Contact Time

The contact time is the setting time on EPDM foam rubber, i.e. the period of time for which the parts to be joined have to be pressed together until material failure occurs during separation of the bond.

2. Tensile Shear Strength

The test specimens were produced and prepared as follows:

Cleaned and sandblasted Al plates measuring 25×100 mm were bonded with a 12.5 mm overlap. The specimens were then stored first for 5 days in a conditioned atmosphere (20° C./65% relative air humidity) and then for 2 days at 105° C. in a heating cabinet.

The tensile shear strength was measured at the indicated temperature in accordance with DIN EN 1465 (rate of advance 10 mm/min.) and is expressed in N/mm$^2$.

The results are set out in Tables 1 and 2. The tests show that the contact time is only negligibly lengthened and, in all the cases investigated, is between 5 and 6 seconds. Both monofunctional and bifunctional additives improve tensile shear strength at elevated temperature. In the cases mentioned (see Table below), the values obtained where the compounds are used in combination are distinctly higher than might have been expected from the individual effect's taken together. Accordingly, a synergistic effect may be assumed to occur in the Examples mentioned.

TABLE 1

Tensile shear strength and contact time in dependence upon the type and composition of the monomers

| No. | Basic monomer | Monomers added Type/proportion % | Type/proportion % | Tensile shear strength N/mm$^2$ | °C. | Contact time secs. |
|---|---|---|---|---|---|---|
| 1 | Ethyl cyanoacrylate | CPDS-ME/0 | Bis-CPD/0 | 3.6 | 105 | 3 |
| 2 | | 5 | 0 | 6.8 | | 5–6 |
| 3 | | 8 | 0 | 6.1 | | 5–6 |
| 4 | | 11 | 0 | 5.9 | | 5–6 |
| 5 | | 0 | 5 | 6.4 | | 5–6 |
| 6 | | 5 | 5 | 10.5 | | 5–6 |
| 7 | | CPDS-ME/0 | Bis-CPD/0 | 1.3 | 130 | |
| 8 | | 5 | 0 | 2.4 | | |
| 9 | | 8 | 0 | 1.3 | | |
| 10 | | 11 | 0 | 1.8 | | |
| 11 | | 0 | 5 | 3.1 | | |
| 12 | | 5 | 5 | 8.1 | | |
| 13 | | CPDS-ET/0 | Bis-CPD/0 | 1.3 | 130 | |
| 14 | | 0 | 5 | 3.2 | | |
| 15 | Ethyl cyanoacrylate | CPDS-ET/5 | Bis-CPD/0 | 3.1 | | |
| 16 | | 5 | 5 | 6.8 | | |
| 17 | " | CPDS-ME/0 | TMBCP 0 | 1.3 | 130 | |
| 18 | | 0 | 5 | 2.9 | | |
| 19 | | 5 | 0 | 2.4 | | |
| 20 | | 5 | 5 | 4.6 | | |
| 21 | Isopropyl cyanoacrylate | CPDS-ET/0 | TMBCP 0 | 2.6 | 130 | |
| 22 | | 0 | 0.2 | 2.8 | | |
| 23 | | 0 | 1.2 | 3.4 | | |
| 24 | | 5 | 0.2 | 5.5 | | |
| 25 | | 5 | 1.0 | 7.8 | | |
| 26 | | 5 | 0 | 4.8 | | |

What is claimed is:

1. A cyanoacrylate adhesive comprised of one or more 2-cyanopentadienoic acid esters and one or more alkylene-bis-(2-cyanopentadienoates).

2. The cyanoacrylate adhesive of claim 1 wherein at least one of the alkylene-bis-(2-cyanopentadienoates) has an alkylene group containing 2 to 18 carbon atoms.

3. The cyanoacrylate adhesive of claim 1 wherein at least one of the 2-cyanopentadienoic acid esters has an alkyl group containing 1 to 10 carbon atoms.

4. The cyanoacrylate adhesive of claim 1 wherein the 2-cyanopentadienoic acid esters and the alkylene-bis-(2-cyanopentadienoates) comprise in total up to 25 percent by weight of the cyanoacrylate adhesive.

5. The cyanoacrylate adhesive of claim 1 characterized by a ratio by weight of 2-cyanopentadienoic acid esters to alkylene-bis-(2-cyanopentadienoates) of 4:1 to 0.25:1.

6. The cyanoacrylate adhesive of claim 1 additionally comprising one or more monocyanoacrylates corresponding to the general formula

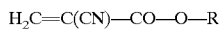

where R is an alkyl, alkenyl, cycloalkyl, aryl, alkoxyalkyl, aralkyl or haloalkyl group.

7. The cyanoacrylate adhesive of claim 6 wherein at least one of said monocyanoacrylates is selected from the group consisting of allyl, methoxyethyl, ethoxyethyl, methyl, ethyl, propyl, isopropyl and butyl esters of 2-cyanoacrylic acid.

8. The cyanoacrylate adhesive of claim 6 wherein the monocyanoacrylates represent the largest percentage by weight of polymerizable monomers in the cyanoacrylate adhesive.

9. The cyanoacrylate adhesive of claim 1 additionally comprising one or more additives selected from the group consisting of plasticizers, thickeners, stabilizers, primers, and dyes.

10. A method of bonding an electrical or electronic component comprising using the cyanoacrylate adhesive of claim 1 to form an adhesive bond in said electrical or electronic component.

11. A cyanoacrylate adhesive comprised of (a) one or more monocyanoacrylates corresponding to the general formula

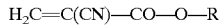

where R is an alkyl, alkenyl, cycloalkyl, aryl, alkoxyalkyl, aralkyl or haloalkyl group; (b) one or more 2-cyanopentadienoic acid esters having an alkyl group containing 1 to 10 carbon atoms; and (c) one or more alkylene-bis-(2-cyanopentadienoates) having an alkylene group containing 2 to 18 carbon atoms; wherein the 2-cyanopentadienoic acid esters and the alkylene-bis(2-cyanopentadienoates) comprise in total up to 25 percent by weight of the cyanoacrylate adhesive and wherein the cyanoacrylate adhesive is characterized by a ratio by weight of 2-cyanopentadienoic acid esters to alkylene-bis-(2-cyanopentadienoates) of 4:1 to 0.25:1.

12. The cyanoacrylate adhesive of claim 11 wherein the alkylene group contains 2 to 4 carbon atoms.

13. The cyanoacrylate adhesive of claim 11 wherein the alkyl group containing 1 to 4 carbon atoms.

14. The cyanoacrylate adhesive of claim 11 wherein the ratio of 2-cyanopentadienoic acid esters to alkylene-bis-(2-cyanopentadienoates) is from 2:1 to 0.5:1.

15. The cyanoacrylate adhesive of claim 11 wherein the 2-cyanopentadienoic acid esters and the alkylene-bis-(2-cyanopentadienoates) comprise in total from 1 to 15 percent by weight of the cyanoacrylate adhesive.

16. The cyanoacrylate adhesive of claim 11 wherein at least one of the monocyanoacrylates is selected from the group consisting of allyl, methoxyethyl, ethoxyethyl, methyl, ethyl, propyl, isopropyl and butyl esters of 2-cyanoacrylic acid.

17. The cyanoacrylate adhesive of claim 11 additionally comprising one or more additives selected from the group consisting of plasticizers, thickeners, stabilizers, primers, and dyes.

18. A cyanoacrylate adhesive comprised of (a) one or more monocyanoacrylates selected from the group consisting of allyl, methoxyethyl, ethoxyethyl, methyl, ethyl, propyl, isopropyl and butyl esters of 2-cyanoacrylic acid; (b) one or more 2-cyanopentadienoic acid esters having an alkyl group containing 1 to 4 carbon atoms; and (c) one or more alkylene-bis-(2-cyanopentadienoates) having an alkylene group containing 2 to 4 carbon atoms; wherein the 2-cyanopentadienoic acid esters and the alkylene-bis-(2-cyanopentadienoates) comprise in total from 1 to 15 percent by weight of the cyanoacrylate adhesive and wherein the cyanoacrylate adhesive is characterized by a ratio by weight of 2-cyanopentadienoic acid esters to alkylene-bis-(2-cyanopentadienoates) of from 2:1 to 0.5:1.

19. The cyanoacrylate adhesive of claim 18 wherein at least one of the 2-cyanopentadienoic acid esters is selected from the group consisting of 2-cyanopentadienoic acid methyl ester and 2-cyanopentadienoic acid ethyl ester.

20. The cyanoacrylate adhesive of claim 18 wherein at least one of the alkylene-bis-(2-cyanopentadienoates) is selected from the group consisting of ethylene-bis-(2-cyanopentadienoate) and tetramethylene-bis-(2-cyanopentadienoate).

21. The cyanoacrylate adhesive of claim 18 additionally comprising one or more additives selected from the group consisting of plasticizers, thickeners, stabilizers, primers, and dyes.

22. A method of bonding electrical or electronic component comprising using the cyanoacrylate adhesive of claim 18 to form an adhesive bond in said electrical or electronic component.

* * * * *